(12) United States Patent
Kamstra

(10) Patent No.: US 6,598,829 B2
(45) Date of Patent: Jul. 29, 2003

(54) HAND LUGGAGE LOCKER ASSEMBLY WITH REDUCED-PRESSURE MEANS

(75) Inventor: Paulus Rein Kamstra, Zegveld (NL)

(73) Assignee: Stork Products Engineering B.V. (NL)

( * ) Notice: Subject to any disclaimer, the term of this patent is extended or adjusted under 35 U.S.C. 154(b) by 0 days.

(21) Appl. No.: 10/114,139

(22) Filed: Apr. 2, 2002

(65) Prior Publication Data
US 2002/0153453 A1 Oct. 24, 2002

(30) Foreign Application Priority Data
Apr. 10, 2001 (NL) .............................................. 1017811

(51) Int. Cl.[7] ................................................ B64D 11/00
(52) U.S. Cl. ................................ 244/118.1; 244/118.5; 312/248
(58) Field of Search ......................... 244/117 R, 118.1, 244/118.5, 119, 137.1; 312/266, 269, 246, 247, 248, 272, 319.1, 7.1, 325, 326, 28; 105/321, 315; 49/205, 206, 248, 379; 254/93 R

(56) References Cited

U.S. PATENT DOCUMENTS

| 5,383,628 A | * | 1/1995 | Harriehausen et al. ... | 244/118.1 |
| 5,441,218 A | * | 8/1995 | Mueller et al. ........ | 244/118.1 |
| 5,842,668 A | * | 12/1998 | Spencer .................. | 244/118.1 |
| 5,934,615 A | * | 8/1999 | Treichler et al. ........ | 244/118.5 |
| 6,045,204 A | * | 4/2000 | Frazier et al. .............. | 312/247 |
| 2001/0011692 A1 | * | 8/2001 | Sprenger et al. ........ | 244/118.5 |

FOREIGN PATENT DOCUMENTS

DE 19800588 A1 7/1999

* cited by examiner

Primary Examiner—Michael J. Carone
Assistant Examiner—Gabriel S. Sukman
(74) Attorney, Agent, or Firm—Hoffman & Baron, LLP

(57) ABSTRACT

Hand luggage locker assembly for use in an aircraft cabin. The assembly includes a shell-like locker, a track mechanism for moveably connecting the locker to an aircraft structure between a closed position and an open position, and a lifting mechanism for relieving the muscle power required for a user to move the locker between the closed position and the open position. The lifting mechanism includes a moveable lifting body which, on one side, is connected to the track mechanism or to the locker and, on its other side, is connected to the aircraft structure, which lifting body is coupled to a pneumatic system. The pneumatic system includes means for supplying an underpressure compared to the pressure in the cabin, control means being provided for at least supplying the underpressure to the lifting body when the locker is to be moved upwards in a controlled manner with the aid of the underpressure as power source.

10 Claims, 2 Drawing Sheets

HAND LUGGAGE LOCKER ASSEMBLY WITH REDUCED-PRESSURE MEANS

CROSS-REFERENCE TO RELATED APPLICATION

This application claims priority to Netherlands Patent Application No. 1017811, filed on Apr. 10, 2001.

FIELD OF THE INVENTION

The invention relates to a hand luggage locker assembly for use in an aircraft cabin, comprising a shell-like locker, a track mechanism for moveably connecting said locker to an aircraft structure between a closed position and an open position, a lifting mechanism for relieving muscle power required for a user to move said locker between said closed position and said open position, said lifting mechanism comprising a moveable lifting body which, on one side, is connected to said track mechanism or to said locker and, on its other side, is connected to said aircraft structure, which lifting body is coupled to a pneumatic system.

BACKGROUND OF THE INVENTION

In large passenger aircraft which are to be constructed in future, the hand luggage lockers will be so high that it will not be easy to put hand luggage into them or to remove hand luggage therefrom. It is already known to mount hand luggage lockers moveably on the aircraft structure in such a manner that the lockers can move approximately half a meter up and down. In a lowermost position, it is then easy to introduce or remove hand luggage, after which the locker can be moved back upwards to an uppermost position. Not every passenger is tall or strong enough to move the locker all the way back up on his own. This is because the locker together with hand luggage may weigh about 50 kg. With this in mind, it is already known to provide a lifting mechanism which is either completely responsible for or considerably facilitates moving the locker up and down. Lifting mechanisms which have already been used for this purpose employ electric motors or air springs. However, electric motors may cause electrical accidents, such as short circuits, overloads and fires. In the uppermost position of the locker, air springs take up large amounts of space and cannot automatically be adapted to variations in the load weight.

U.S. Pat. No. 5,441,218 has disclosed another variant of a lifting mechanism for a hand luggage locker assembly, in which the lifting mechanism comprises piston-cylinder devices which form part of a pneumatic system which is supplied with compressed air. The compressed air in this case originates from pressure compressors. The lifting mechanism can be actuated by means of an on/off switch provided at the corresponding locker. In addition, the assembly comprises a control unit for controlling electrically actuable safety valves. The control unit will have to react automatically as a function of signals emitted by pressure sensors at the edges of the locker and will have to stop the upward or downward movement of the locker quickly, for example in the event of body parts or luggage becoming jammed during a movement of the locker.

A drawback of the lifting mechanism which is known from U.S. Pat. No. 5,441,218 is that it takes up large amounts of space, is expensive to produce and is heavy. In view of the high pressures used, of up to more than 7 bar, for the compressed air in the pneumatic system, in the event of a failure in the pneumatic system, the system may rapidly lead to excess noise and very dangerous situations, such as hoses flapping around. The high weight is very disadvantageous in the aircraft industry in view of the correspondingly increased fuel consumption during flying. A further drawback is that, in the event of a defect in the compressed-air system, the locker cannot be moved up and down by more than a few centimeters.

SUMMARY OF THE INVENTION

It is an object of the present invention to overcome the above mentioned drawbacks and to provide a user-friendly and safe hand luggage locker assembly. In particular, it is an object of the invention to provide a lifting mechanism for an assembly of this type which takes up little space and provides considerable flexibility.

According to the invention, this object is achieved by a hand luggage locker assembly for use in an aircraft cabin, comprising a shell-like locker, a track mechanism for moveably connecting said locker to an aircraft structure between a closed position and an open position, a lifting mechanism for relieving muscle power required for a user to move said locker between said closed position and said open position; said lifting mechanism comprising a moveable lifting body which, on one side, is connected to said track mechanism or to said locker and, on its other side, is connected to said aircraft structure, which lifting body is coupled to a pneumatic system, wherein said pneumatic system comprises means for supplying an underpressure compared to an ambient pressure in said cabin, control means being provided for at least supplying said underpressure to said lifting body when said locker is to be moved upwards in a controlled manner with the aid of said underpressure as power source. The pneumatic system comprises means for supplying a reduced pressure compared to the pressure prevailing in the aircraft cabin. There are control means for at least supplying such an underpressure to the lifting body when the locker is to be moved upwards. Underpressure has a very low specific energy density, which results in considerable safety. Electrical systems can be omitted, which is also of benefit to safety. When using underpressure, it is advantageously possible to utilize underpressure pumps which are already present in an aircraft, for example for extraction from the toilets. During flying, it is even possible to make use of pressure differences which prevail between the inside and outside of the aircraft. The pneumatic system with underpressure means may advantageously also fulfil a role in the general treatment of the air. Should the underpressure fail, the locker can still always be moved up and down fully by hand. Consequently, underpressure as a power source is a very advantageous means of at least partially relieving the load on a user when moving a hand luggage locker up and down.

On the ground, both the pressure outside the aircraft and the pressure in the aircraft cabin are approx. 1 bar. At a high cruising altitude, the pressure outside the aircraft drops considerably. For example, at a height of 3 km, the pressure is approx. 0.75 bar, and at 8 km the pressure is approx. 0.25 bar. The cabin pressure may also fall to some extent, but is maintained at, for example, approx. 0.75 bar. Taking this into account, the underpressure means are advantageously designed in such a manner that they supply a substantially constant, desired pressure difference with respect to the pressure prevailing in the cabin at any specific time. In practice, it has been found that the pressure difference between the cabin pressure and the underpressure which is to be supplied by the underpressure means preferably lies in the range between 0.2–0.5 bar.

The dimensions of the lifting body may be such that the underpressure is able to move the locker upwards without further external influence. Preferably, however, the unit is designed in such a manner that it serves as a lifting energizer, considerably relieving the load on a user when the user is pressing the locker upwards. In this case, the lifting energizer is preferably designed in such a way that the muscle force which is still required has to be exerted over the entire distance during the upwards movement and is substantially constant. An advantage of such a lifting energizer of this nature is that the user feels a resistance, which is expected, but a less heavy resistance.

Further preferred embodiments are defined in the subclaims.

BRIEF DESCRIPTION OF THE DRAWINGS

The invention will be explained in more detail with reference to the appended drawing, in which.

DESCRIPTION OF THE PREFERRED EMBODIMENTS

Figure 1:
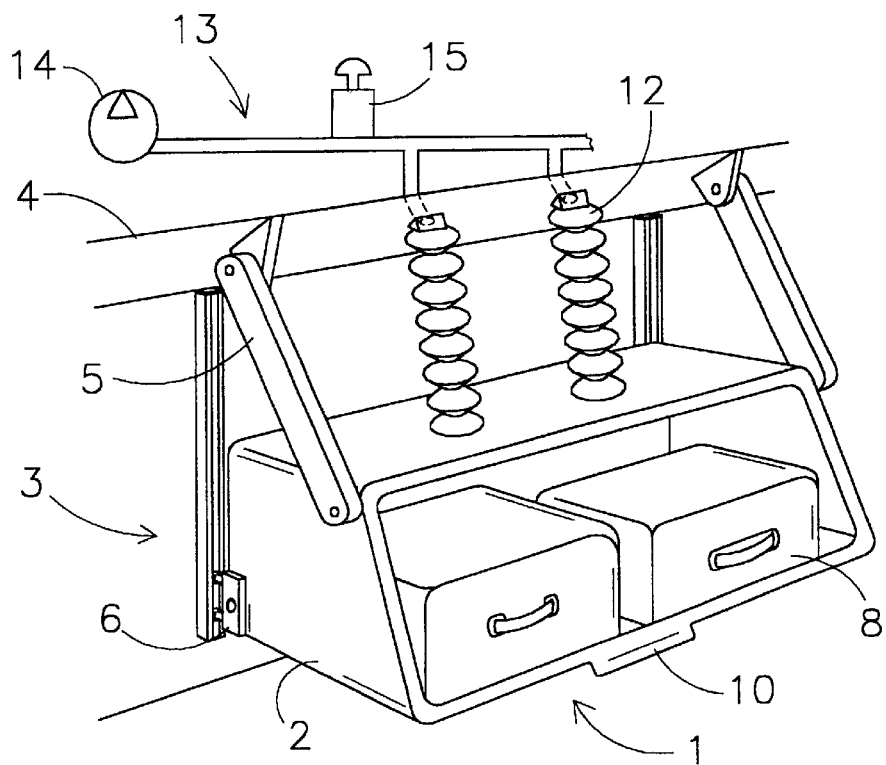
FIG. 1 shows a diagrammatic perspective view of an embodiment of a hand luggage locker assembly with lifting mechanism according to the invention.

The hand luggage locker assembly is denoted overall by reference numeral 1 in FIG. 1. The assembly 1 comprises a locker 2 which is mounted on the structure 4 of an aircraft cabin in such a manner that it can move up and down via a track mechanism 3. The track mechanism 3 in this case comprises two pivot arms 5 and tongue-and-groove guides 6. The locker 2 is of open design on one side, and from this side can be filled with hand luggage 8. On its underside, the locker 2 is provided with a handle 10. The topside of the locker 2 is connected to two lifting bodies 12, which can be contracted and extended, of a lifting mechanism. The lifting bodies 12 are in this case designed as bellows which can be folded together and apart flexibly. The lifting bodies 12 are coupled to a highly diagrammatically illustrated pneumatic system. According to the invention, the pneumatic system comprises underpressure means 13 for supplying underpressure to the lifting bodies 12 at set times, for example when a user wishes to move the locker 2 upwards out of its lowermost position. The underpressure then ensures that the air is sucked out of the bellows; with the result that they are folded together and exert an upwardly directed force on the locker 2. The bellows have the considerable advantage that the folded-up volume of the bellows in the uppermost position of the locker 2 is very small. Consequently, the installation space required is small. Moreover, the bellows may advantageously be of lightweight design. Instead of a bellows, it is also possible to use a different type of body which can be flexibly contracted and extended. In the uppermost position, the locker 2 can be mechanically locked to the aircraft structure 4 or to the track mechanism 3 in some other way.

The underpressure means 13 may comprise underpressure pumps 14, which can deliver underpressure to a underpressure line, which line is connected to the lifting bodies 12. The underpressure pumps 14 may in this case be directly coupled to the line or may be connected to a buffer. In addition, during flying, the underpressure means 13 may make use of the lower pressures prevailing high in the air outside the aircraft. These lower pressures can then be delivered directly to the underpressure line or may be temporarily stored in a buffer.

The underpressure means for the lifting mechanism according to the invention may advantageously be shared by other systems in the aircraft which also require underpressure, such as the toilet facilities or the air treatment system.

The underpressure may be coupled to the lifting bodies 12 via an on/off switch 15. However, it is advantageous to use a system such as that which will be explained below with reference to FIG. 2.

The locker 2 may be moved downwards purely on the basis of the weight of the locker 2 itself (together with its load). It is then sufficient to unlock the locker 2 and to give the lifting bodies 12 the freedom to fill themselves with air by suction. The latter operation can take place by placing the lifting bodies 12 into flow communication with ambient pressure such as that which prevails in the cabin, optionally in combination with removing the underpressure originating from the underpressure means 13. However, it is advantageous for the lifting bodies 12 to fill themselves with air by suction in a controlled manner, for example via a throttle valve, such that the lifting bodies 12 continue to exert a certain upwardly directed force on the locker 2 while the locker 2 is moving downwards. The locker 2 is, as it were, decelerated during the downwards movement, and the user will only have to apply a little muscle force.

In a variant, the underpressure is gradually removed, as a result of which the lifting bodies 12 can likewise expand gradually and the locker 2 can move downwards in a controlled manner.

Figure 2:
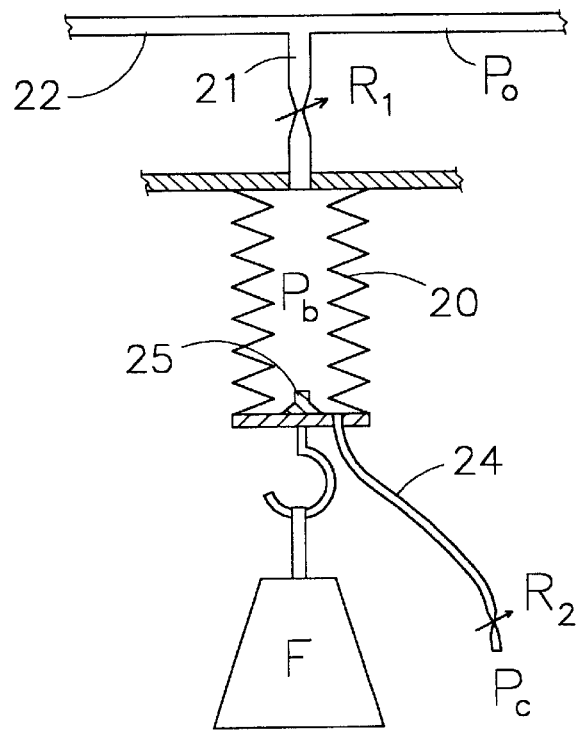
FIG. 2 shows a diagrammatic view of a preferred design variant of a lifting mechanism with automatic means for energizing lifting.

FIG. 2 shows a preferred embodiment of a lifting mechanism with bellows 20 which can be used, for example, for a hand luggage locker assembly as shown in FIG. 1. The load produced by the hand luggage locker is in this case symbolically indicated by a weight force F. The inside of the bellows 20 is coupled, via a branch 21, to an underpressure line 22 in which a system underpressure Po of approx. 0.5 bar prevails. A throttle valve R1 is arranged between the bellows 20 and the underpressure line 22. Furthermore, the inner side of the bellows 20 can be coupled, via an inlet 24, to the environment inside the aircraft cabin. A throttle valve R2 is provided in the inlet 24. The pressure inside the bellows 20 is defined as Pb, while the ambient pressure in the aircraft cabin is defined as Pc.

The resistance set for the throttle valve R1 is a measure of the maximum rate of upwards movement of the locker. This can be selected appropriately by the designer. The resistance set for the throttle valve R2 is a measure of the maximum rate of downwards movement. The rates of upwards and downwards movement are in this case also dependent on the system underpressure Po, the volume of the bellows 20 and the cross-sectional area of the bellows 20.

In the embodiment shown, the resistance of the throttle valve R2 is designed to be adjustable, and in particular forms an actuating member which is connected to the locker, the resistance of the throttle valve R2 being a function of the extent of external load exerted by a user. Consideration may be given to a compressible outlet hose which is integrated in a handle of the hand luggage locker. The greater the external load, the greater the resistance provided by the throttle valve R2. If a user makes the resistance of the throttle valve R2 infinitely great (by completely closing the inlet 24), it will be possible for the locker to move upwards at the maximum set speed. The user will in this case have to maintain his external load on the actuating member for as long as he wishes to move the locker upwards. As soon as the user stops and, for example, releases the handle, the resistance of the throttle valve R2 will decrease and the locker will'stop moving upwards.

It is preferable for the throttle valve R2 to be designed in such a way that, in an unactuated position, the initial resistance of the throttle valve R2 is sufficiently low for the weight of an empty locker to move the locker slowly downwards. By making the resistance of the throttle valve R2 zero (i.e. by completely opening the inlet 24), the locker will be able to move downwards at the maximum set speed. All the intermediate levels of resistance R2 will moderate the speed of movement in the desired direction accordingly.

The following control arrangements may be considered:
if the user presses so hard that throttle valve resistance R2>> throttle valve resistance R1, the locker will move upwards at the same speed as the hand of the user;
if the user does not exert any external load, the locker will move slowly downwards; and
if the user presses so softly or even pulls that throttle valve resistance R2>> throttle valve resistance R1, the locker will move downwards at the same speed as the user's hand.

The force which is required to sufficiently increase or decrease the value for the throttle valve R2 may, for example, be selected at approximately 10% of the mean load of a locker with its cargo.

In the locked, uppermost position, the underpressure line is automatically closed off from the bellows 20. This saves energy and avoids excessive noise. In the embodiment shown, the base of the bellows 20 is, for this purpose, equipped with an upwardly projecting sealing body 25. In the uppermost position of the locker, the body 25 automatically moves into the branch 21 and completely or partially closes it.

In the uppermost position of the locker, the internal volume of the folded-up bellows 20 is preferably small. This ensures that the locker, after it has been unlocked, can only drop downwards very slightly. The initial resistance of the throttle valve R2 must in this case be high, with the result that the pressure in the bellows 20 will decrease so quickly when it is folding open that the locker cannot drop further downwards. Moreover, after the slight drop the body 25 will immediately open the branch 21, with the result that the underpressure line 22 is automatically connected to the bellows 20, and will exert an upwardly directed force on the locker via the prevailing underpressure.

Figure 3:
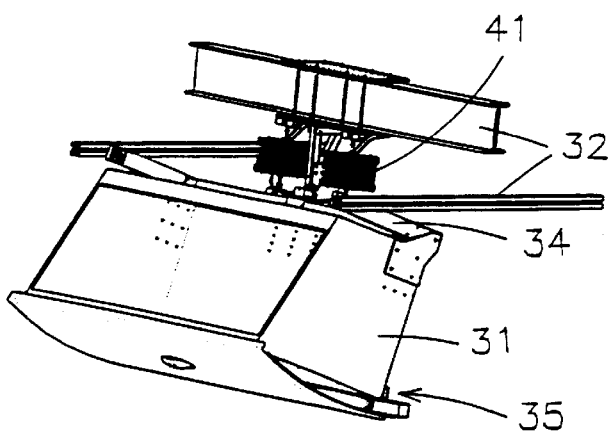
FIG. 3 shows a diagrammatic, perspective view of a preferred embodiment in the raised position.
Figure 4:
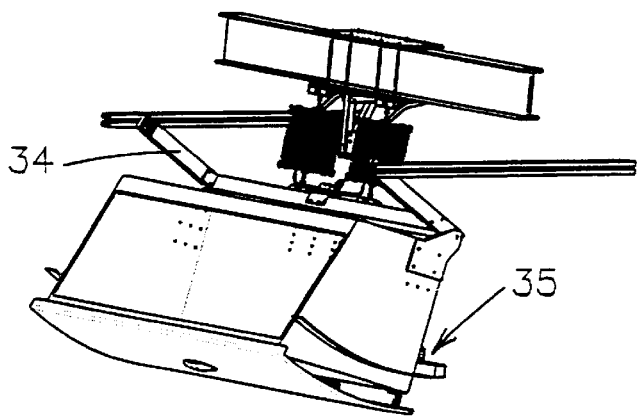
FIG. 4 shows a view corresponding to that shown in FIG. 3, in a partly lowered position.
Figure 5:
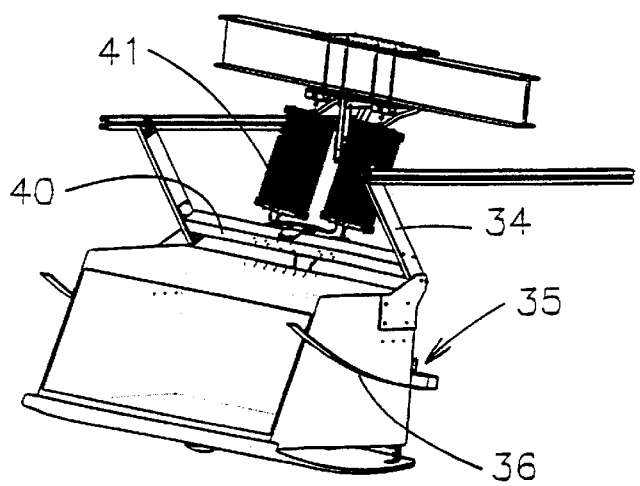
FIG. 5 shows a view corresponding to that shown in FIG. 3, in the lowered position.

FIGS. 3–5 show a preferred embodiment of the hand luggage locker assembly, which differs substantially in terms of the track mechanism via which a locker 31 is mounted on the structure 32 of an aircraft cabin in such a manner that it can move up and down. The track mechanism comprises two pivot arms 34 and a roller guide 35 which rolls along the rear wall of the locker 31. While the locker 31 is moving downwards, the pivot arms 34 move towards a more vertical position, and the roller guide 35 comes to bear against a part of the rear wall of the locker 31 which lies further towards the top.

Furthermore, the roller guide 35 is provided with two arc-shaped side supports 36, which delimit the locker 31 laterally and at the top.

A transverse bar 40 extends between the pivot arms 34. Two lifting bodies 41 of a lifting mechanism according to the invention are coupled to the structure 32, on the one hand, and to the transverse bar 40, on the other hand.

In addition to the embodiments shown, numerous variants are possible. For example, instead of a body which can be flexibly contracted and extended, it is also possible to use a piston-cylinder system or a diaphragm system with two chambers which are separated from one another by a movable diaphragm and of which one can be set to a underpressure, the diaphragm being coupled to the locker via an arm or the like. The throttle valve in the inlet of the lifting body can also be designed so that it can be adjusted in some other way. As an alternative to the adjustable throttle valve in the inlet of the lifting body, it is also possible for the throttle valve provided between the underpressure line and lifting body to be of adjustable design.

Thus, the invention provides a hand luggage locker assembly which advantageously utilizes underpressure as an actuation-dependent means of energizing lifting when the locker is being moved up and down. The use of underpressure as a power source provides numerous advantageous design options, such as optimizing the weight and safety.

What is claimed is:
1. Hand luggage locker assembly for use in an aircraft cabin, comprising:
a shell-like locker;
a track mechanism for moveably connecting said locker to an aircraft structure between a closed position and an open position;
a lifting mechanism for relieving muscle power required for a user to move said locker between said closed position and said open position;
said lifting mechanism comprising a moveable lifting body which, on one side, is connected to said track mechanism or to said locker and, on its other side, is connected to said aircraft structure, which lifting body is coupled to a pneumatic system,
wherein said pneumatic system comprises means for supplying an underpressure compared to an ambient pressure in said cabin, control means being provided for at least supplying said underpressure to said lifting body when said locker is to be moved upwards in a controlled manner with the aid of said underpressure as power source.

2. Hand luggage locker assembly according to claim 1, in which said underpressure means supply a pressure difference with respect to said ambient pressure in said cabin which is in the range from
0.2
0.5 bar.

3. Hand luggage locker assembly according to claim 1, in which said underpressure means comprise an underpressure pump.

4. Hand luggage locker assembly according claim 1, in which said lifting body is a lifting body which can be flexibly contracted and extended.

5. Hand luggage locker assembly according to claim 1, in which said underpressure is used as lifting energizer.

6. Hand luggage locker assembly according to claim 1, in which a throttle valve is provided between said underpressure means and said lifting body.

7. Hand luggage locker assembly according to claim 1, in which said lifting body is provided with an inlet, via which said lifting body can be brought into contact with said ambient pressure in said cabin.

8. Hand luggage locker assembly according to claim 7, in which an actuable, in particular pressure-dependent throttle valve is provided in the inlet.

9. Hand luggage locker assembly according to claim 8, in which said actuable throttle valve is provided in an actuating handle of said locker.

10. Hand luggage locker assembly according to claim 1, in which said lifting body is provided with a sealing body for sealing said means for supplying said underpressure with respect to said lifting body in an uppermost position.

* * * * *